(No Model.)
R. H. READ.
SYSTEM FOR SYNCHRONIZING ELECTRIC MOTORS.
No. 411,611. Patented Sept. 24, 1889.
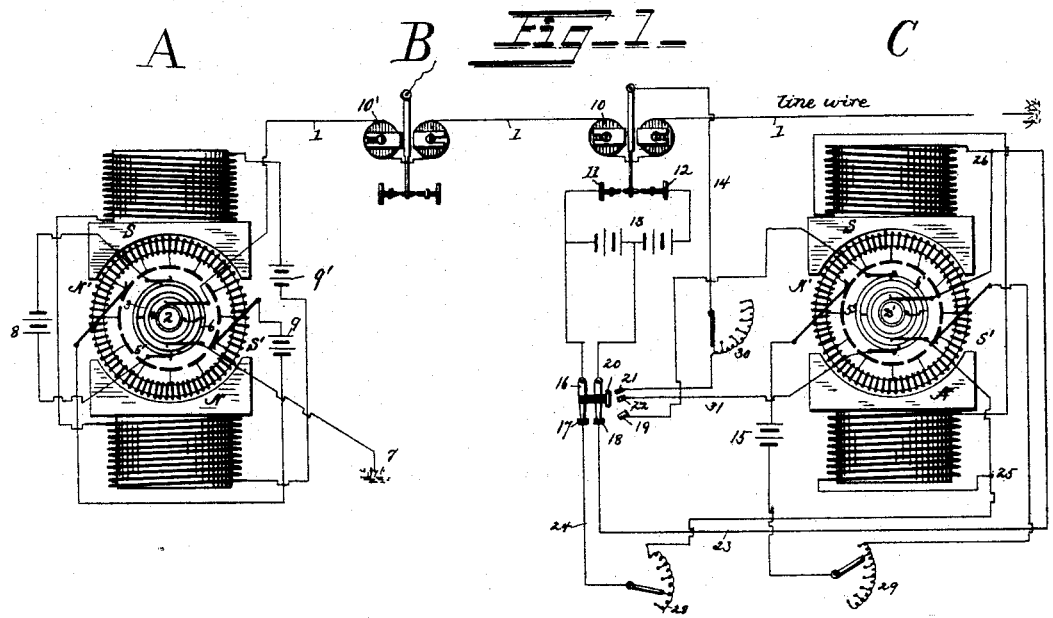
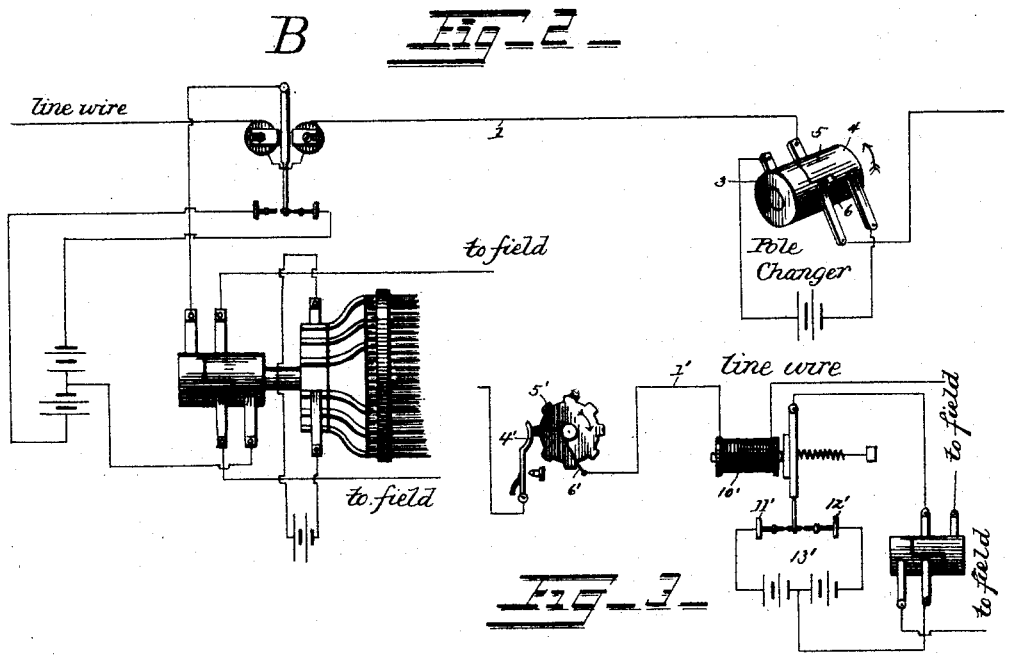
WITNESSES
INVENTOR

UNITED STATES PATENT OFFICE.

ROBERT HAMILTON READ, OF WASHINGTON, DISTRICT OF COLUMBIA.

SYSTEM FOR SYNCHRONIZING ELECTRIC MOTORS.

SPECIFICATION forming part of Letters Patent No. 411,611, dated September 24, 1889.

Application filed February 12, 1889. Serial No. 299,627. (No model.)

*To all whom it may concern:*

Be it known that I, ROBERT HAMILTON READ, a citizen of the United States, residing at Washington, in the District of Columbia, have invented certain new and useful Improvements in Electric Motors and Systems for Synchronizing the Same; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object the production and preservation of a synchronous movement of rotating spindles at distant stations with a view to rendering such movement available for telegraphic or other purposes where it may be desirable to have such spindles make a whole revolution simultaneously or reach any point in the circumference of travel at the same instant. Such a synchronous motion is utilized in telegraphy by driving contact-trailers by the rotating parts and making such trailers sweep circles of contacts corresponding to distant signaling-stations.

With this end in view the invention consists in locating at several stations electric motors provided with devices for preserving a continuous driving effort on the rotating parts as long as they move synchronously, and for removing said driving effort and exercising a retarding effect when the moving parts get out of synchronism.

The invention more specifically consists in providing means whereby a reversal in magnetism in one of the co-operating elements of a driven motor will be caused when its moving part gets out of synchronism with the fluctuations of current in a controlling-line.

The invention also consists in a synchronizing system in which there is a common controlling-circuit in which periodical current changes are produced, the several controlled motors of the system being excited by sources of energy tending to drive them at a more rapid pace than would be produced by the current changes, each driven motor operating devices which will produce sufficient retarding effect periodically to reduce its pace to a degree at which it will correspond accurately to the changes of controlling-line current or to the pace of a controlling-motor of the system.

The invention also consists in providing each of the controlled or driven motors with connections to a local source of energy, by which it may be given a sufficient starting-speed to fall into step with the controlling-motor when the control over it of the line-current is established, so that it may be readily placed in synchronous movement with other motors of the system without necessarily slowing down the controlling-motor.

The invention also embodies other features, which will be more particularly hereinafter described in the specification, and will be definitely indicated in the appended claims.

In the accompanying drawings, which illustrate my invention, Figure 1 is a diagrammatic view illustrating three stations distant from one another, at two of which are shown electric motors arranged in accordance with my invention. Fig. 2 is another view of the same, showing a pole-changer for producing reversals in the line-current, which may be operated by any electric or mechanical motor. Fig. 3 is a diagrammatic view showing a specific form in which an interrupted current of single polarity is used in the controlling-circuit.

In carrying out my invention I prefer to use electric motors of the ring or drum armature type, in which the polar points of the magnetic elements do not vary materially from a predetermined position, so that the power exerted on the moving part of the motor will always be of a substantially constant value, that said moving part may not be driven more rapidly at one part of a complete revolution than at another, and in order that the retarding effort, whenever it may come, will find the moving part in a position in which its influence may be inevitably asserted and will always have a constant value.

Referring to Fig. 1 of the drawings, A, B, and C represent three stations distant from one another, at which it may be desired to locate synchronously-moving parts.

1 is a line-wire passing through the several stations. I cause variations of current to exist in said line-wire by a pole-changing or current-interrupting or varying device.

In Fig. 1 I have shown a system in which the motors are controlled by reversals in the line-current, said reversals being produced by a pole-changing device operated by the moving part of the motor at station A.

In Fig. 2 the reversals are produced by an independent pole-changing device, and therefore all of the motors of the system in Fig. 2 become controlled motors.

In Fig. 3 a simple interrupter is inserted in the line. At the several stations and interposed in the line-circuit are polarized relays or vibrators which will respond to rapid changes of current thrown upon the line by the pole-changing or current-interrupting device.

In the system shown in Fig. 1 the motor at station A is a common driving-motor for all the others of the system and sets the pace or rate of speed at which the motors B and C at other stations that may be included in the system may travel. The motor at A is shown as provided with a pole-changing device carried by its spindle 2. This device consists of two collecting-rings 3 4, electrically connected, respectively, with the insulated half-segments 5 6 of a split ring. Upon the continuous collecting-rings bear two brushes connected with the two sides of the line. One of these brushes is shown as going to earth at 7, and the other is connected with the line-wire 1. Upon the split ring bear two brushes electrically connected, respectively, with the opposite poles of a battery 8.

The structure of the pole-changer will be clearly understood by a reference to Fig. 2, where 3 and 4 represent the collecting-rings and 5 and 6 the segments electrically connected with 3 and 4, respectively, but insulated from one another. The motor at A is provided with a ring-armature and a suitable commutator, as shown, for producing magnetic poles at N S and N' S' of the field-magnet and armature. As shown, the field-magnet and armature are excited by independent sources of electrical energy 9 and 9', though any means of exciting the motor, whether the field and armature coils be arranged in shunt or series relation, or, as shown, be independently excited, may be adopted. Under the influence of the current from batteries 9 and 9' the armature of machine at A acquires a uniform speed, and as the segments 5 6 of the split ring come under their co-operating brushes a reversal of current in the line is produced, inasmuch as the collecting-rings, which are in constant connection with the line-wire, are alternately connected with opposite poles of the battery 8, the positive pole of the battery being thrown to ground or to line, accordingly as the brush connected with said pole bears on segment 5 or 6 of the split ring.

In practice I prefer to make a comparatively fine line of division between the two segments of the split ring and arrange their co-operating brushes, so that the reversals of line-current will accurately occur at each half-revolution of the armature of the controlling-motor. These reversals of current pass through the polarized relays 10 10' at the distant stations and keep the armatures of said relays in engagement with corresponding contacts for equal lengths of time. For sake of simplicity in illustration, the motor and circuit connections of station B have not been shown; but it will be understood that the connections for this station are precisely identical with those at station C, which will now be described.

The armature of relay 10 is kept rocking between its contact-points 11 12, shifting with each reversal of the line-current. These contact-points are electrically connected with the opposite poles of a split battery 13. The pivotal point of the armature and the middle point of the split battery are connected through a pole-changer precisely analogous to that described at station A to the two terminals of the field-coils of the armature at C. The armature of the motor at C is excited by an independent source of energy. This armature is also of the ring or drum type.

From what has thus far been stated it will be evident that at station C or any other station at which there is a driven motor there are two pole-changing devices—one actuated by the line-current and the other actuated by the motor itself, and that either of these pole-changers will produce reversals of current in one of the circuits of the driven motor. So long, therefore, as these two pole-changers create their reversals simultaneously the direction of current in the circuit they control will be of a constant polarity, and it is this feature that constitutes the fundamental idea of my invention. As one of the pole-changers is carried by the moving part of the motor at C, it will be evident that so long as the moving part (shown as the armature) produces exactly a half-revolution from the time the relay-armature leaves one contact until it reaches it again no reversal of current will occur in the circuit it controls, shown in this instance as the field-magnet circuit, but the instant it gets out of synchronism with the relay the polarity of the field-magnet will be reversed and a retarding effect will be exerted upon the armature. It will be seen, therefore, by reason of the structure of the pole-changer carried by the armature of the motor at station C, that if the armature gains on the motor at A and reaches a definite point in its revolution before the armature of the relay 10 leaves its stop, the poles of the field-magnet will be reversed and the armature will be held or slowed down until it falls into synchronism with the controlling motor. It can never, therefore, move at a faster rate than the controlling motor. If, now, we give the current which operates the motor at C such electro-motive force as would drive the motor on a constant circuit at a faster pace than that given the motor at A, it will be evident that at no time can the motor at C be slower than that at A. As it can neither be slower nor faster, it must therefore acquire the same pace. At a speed of several hundred revolutions per minute the correcting influences are exerted for so short a period that the driven and driving parts move in very accurate synchronism. To accomplish these results the armature of the motor at C is excited by a separate and constant source of energy, as a battery 15. On the pole-changer carried by the spindle 2' of the armature at C bear four brushes, two of which connect with the continuous contact-collecting rings, and two of which bear upon the segments of the split ring. The former two are connected with the opposite terminals of the field-magnet coils, and the latter two are connected with the middle point of the split battery 13 and the pivotal point of the relay-armature through a switch 16. This switch is so constructed that it may be used to throw one wing of the split battery through the field as a constant circuit, or may be used to break this circuit and establish a circuit through the field by way of the pole-changer already described. As shown, the switch has its two pivotal points connected with the left wing of battery 13 and connects the battery-poles with contact-blocks 17 and 18, which are electrically connected by means of conductors 23 and 24 with opposite ends of the field-magnet coils. When the switch occupies the position shown in the drawing, the relay 10 has no effect upon the current passing through the field-magnet coils; but when the switch is shifted so that when one arm of the switch rests on contact-block 19 the permanent circuit is broken and a new circuit is made, including the two pole-changing devices operated by the relay and motor armature, respectively. When the switch is shifted, a metallic arm 20, insulated from it, bridges two contact-blocks 21 22. Contact-block 21 is electrically connected with the pivotal point of the relay-armature, and contact-blocks 19 and 22 are electrically connected with the brushes co-operating with the segments of the split ring 5' 6'.

In operating the system the switch 16 is first placed upon contact-blocks 17 18, which establishes a circuit from the left wing of battery 13 through the two limbs of switch 16, through conductors 23 and 24 to the points 25 and 26, and thence through the field-magnet coils. In all of the motor-circuits I preferably interpose variable resistances 28 29 30, by which the strength of current flowing through the exciting-circuits may be regulated. The resistance 28 is adjusted until the armature takes a higher speed than that of the armature at station A, which latter is indicated by the beats of the relay-armature. The switch 16 is then shifted so as to rupture the circuit last traced and make a circuit through the contact-blocks 19 21 22. When the relay-armature engages its left stop 11, we will then have a circuit from the copper side of left wing of battery 13 to contact-block 19 to split ring of the pole-changer on spindle 2', thence by way of the collecting-ring to and through the field-coils, thence to the other collecting-ring and the other segment of the split ring and its co-operating brush, and thence by way of conductor 31 to contact-block 22, bridge-block 20, contact-block 21, variable resistance 30, conductor 14, relay-armature and contact-stop 11 to the zinc side of the battery. When the relay-armature shifts to the contact-stop 12, a reverse current is thrown through this circuit from the right wing of battery 13; but it will be noted that when the relay-armature shifts to contact 12, the segments of the split ring on the armature-shaft are exchanging brushes, and that therefore reversal of current by the relay will have no effect on the direction of current flowing through field-magnet coils. As the armature was given a higher speed in starting than the armature of the driving-motor, when the switch 16 is shifted the ring-segments will exchange brushes an instant before the relay-armature leaves its contact-stop, which will produce an instantaneous reversal of current in the field-magnet coils and check the armature, bringing it to a speed synchronous with that of the driving-motor. The variable resistances 29 and 30 in the field-magnet and armature circuits, either or both of which may be used, should be adjusted to a point where the least amount of correction will be necessary at the half-revolutions of the armature—a position which will vary slightly with the different motors of the system. It will now be seen that by reason of the armature-poles remaining on a fixed line the same pull is exerted upon it at any two instants of time, and no dead-point can occur. It will also be seen that, although the controlling-relay reverses the field-current, said reversal does not effect the polarities of the field-magnets if the machines be in synchronism; but if the armature of the driven motor be behind or ahead of the driving-motor the current through the field-coils will be reversed. As before stated, I provide that it shall never be behind by giving it sufficient current to drive it faster than the motor at A, so that its tendency will be always to gain—a tendency which will be counteracted by the retarding action of the field during an occasional brief reversal.

In Fig. 2 numerals 3, 4, 5, and 6 represent a line pole-changer, which may be driven by an independent electric motor, or even by a clockwork, to produce the reversals upon the line-circuit, the only function it has to serve being to produce at equally-distant points of time reversals in the line-current which will actuate the polarized relays controlling the driven motors. The connections of the motor shown at the station B in Fig. 2 will be sufficiently understood from what has been said in relation to Fig. 1 without further description.

In Fig. 3 a current-interrupter 5', consisting of a simple toothed wheel provided with a brush 6', bearing on its spindle, and a contact-brush 4' is used to produce interruptions in the line-circuit 1' in lieu of a polarized relay at any station. In this case a simple magnet 10' may be used, having a spring-retracted armature co-operating with front and back stops 11' 12', connecting with the opposite poles of the split battery 13' in an analogous manner to that shown and described in Fig. 1. It will be seen that if the closures and interruptions of the circuit be of equal duration the continuance of current from the sides of the split battery 13' will be of equal duration.

I desire to have it understood that while I have shown and described local circuits for controlling the strength of current flowing through the motor-coils, my invention is not limited to such an application, but would also include a system in which the line itself connects with the driven motor. I desire to have it understood, also, that, although I have shown the field-magnet and armature circuits in the several motors as independent, they need not necessarily be so in all cases, the only desideratum being that one of the magnetic parts shall have a current of continuous direction at all times, and that the other magnetic part shall have a current of continuous direction only so long as the motor is in synchronism with the driving-motor.

Having thus described my invention, what I claim, and desire to secure by Letters Patent, is—

1. A system for synchronizing electric motors, comprising a controlling-circuit, a series of electric motors controlled thereby, a current-changer for producing periodic current changes in the controlling-circuit, and a commutator actuated by the moving part of each motor for redirecting the current changes at times corresponding to said changes, whereby the attractive effort on the moving part is removed when the current-changers do not coincide and synchronism fails.

2. A system for synchronizing electric motors, comprising a series of motors adapted to operate under a continuous polarity of their field-magnets and armature, a controlling-circuit for said motors, a current-changer for producing periodic current changes in said circuit, and a commutator actuated by the moving part of each driven motor for redirecting the current changes at times corresponding to said changes, whereby the attractive effort on the moving part is removed when the current-changers do not coincide and synchronism fails.

3. A system for synchronizing electric motors, comprising a controlling-circuit, a current-changer for producing periodic current changes therein, one or more electric motors of the ring or drum armature type controlled by the current changes, a pole-changer for each motor operated by the current changes, and an auxiliary pole-changer driven by the motor for reversing the current from the first pole-changer in the exciting-coils of one magnetic element of the station-motor at times corresponding with the reversals of the first pole-changer, whereby a retarding effect will be exerted on the moving part of the station-motor when the two pole-changers fail to coincide or when synchronism varies.

4. A system for synchronizing rotating parts at two or more distant stations, comprising a controlling-motor of any kind, one or more controlled electric motors of the ring or drum armature type, pole-changers actuated by the controlling and the controlled motors, respectively, an electric circuit including a source of energy through both pole-changers and the exciting-circuit of one of the magnetic elements of the controlled motor, and a source of constant energy in the exciting-circuit of the other magnetic element of the controlled motor.

5. A system for synchronizing electric motors, comprising a line-circuit, means for producing periodic reversals of current in said circuit, relays at two or more distant stations operated by the line-current, a pole-changer for a local battery operated by each relay, a series of motors of the ring or drum armature type at the stations, a rotating pole-changer carried by the moving part of each motor, and electric connections between the two pole-changers and the exciting-coils of one magnetic element of the station-motor, whereby its polarity will be reversed when the reversing times of the two pole-changers do not coincide.

6. A system for synchronizing electric motors, comprising a controlling-motor at one station, a pole-changer operated by said motor, a line-circuit, a controlled motor of the ring or drum armature type at a distant station, and a pole-changer carried by its rotating part in circuit with the exciting-coils of one of its magnetic elements, said pole-changer redirecting the reversals caused by the controlling-motor, whereby when synchronism fails a retarding effect will be exerted upon the controlled motor until synchronism is re-established.

7. A system for synchronizing electric motors, comprising a line-circuit in which periodic current changes are produced, a pole-changer at each controlled station operated by the changes on line, a motor of the ring or drum armature type at each controlled station, said motor having independent field and armature circuits and sources of energy for said circuits, an auxiliary pole-changer carried by the moving part of the motor, and electric connections between the two pole-changers and one of the independent circuits, whereby its current will be of constant direction only so long as the movements of the two pole-changers coincide, and whereby synchronism will be preserved.

8. A system for synchronizing electric motors, comprising a line-circuit, a current-changer for producing periodic current changes in said line-circuit, an electric motor at a controlled station, through which retarding-current impulses are caused to pass by the line-current changes, and local sources of energy for driving said motor at a faster rate than the changes of line-current, whereby synchronism may be preserved by retarding impulses.

9. A system for synchronizing electric motors, comprising two or more motors at distant stations, a line-circuit connecting the stations, means controlled by line impulses for correcting slight variations from synchronism of the motors, a switch at each controlled station, and a source of energy controlled by said switch having an electro-motive force sufficient to drive the motor at a pace where the line-correction may be asserted, whereby a driven motor may be brought into synchronism with another without slowing down the latter.

10. A system for synchronizing electric motors, comprising a controlling-circuit, a current-changer for producing periodic current changes in said circuit, an electric motor at each controlled station having its rate of movement dependent upon said current changes, a source of energy exciting the controlled motors having an electro-motive force sufficient to keep them in advance of the current changes at determinate stages of their movement, and a variable resistance for adjusting the strength of current in the motor circuit or circuits for regulating the amount of such lead.

In testimony whereof I affix my signature in presence of two witnesses.

ROBERT HAMILTON READ.

Witnesses:
   W. C. REICHENDER,
   W. A. ROBERTS.

It is hereby certified that in Letters Patent No. 411,611, granted September 24, 1889, upon the application of Robert Hamilton Read, of Washington, D. C., for an improvement in "Systems for Synchronizing Electric Motors," errors appear in the printed specification requiring correction, as follows: In line 10, page 4, a period should be inserted after the reference figure 1', and the following word "in" should commence with a capital $I$, beginning a new sentence; and in line 11, same page, a comma should be substituted for the period after the word "station," and the following word "In" should commence with a small $i$, making the sentence continuous; and that the Letters Patent should be read with these corrections therein that the same may conform to the record of the case in the Patent Office.

Signed, countersigned, and sealed this 1st day of October, A. D. 1889.

[SEAL.]

CYRUS BUSSEY,
*Assistant Secretary of the Interior.*

Countersigned:
　　C. E. MITCHELL,
　　　　*Commissioner of Patents.*